Patented Dec. 3, 1935

2,022,856

UNITED STATES PATENT OFFICE 2,022,856

METHOD OF PRODUCING CELLULOSE ACETATE

Clifford I. Haney, Drummondville, Quebec, Canada, assignor to Celanese Corporation of America, a corporation of Delaware No Drawing. Application January 26, 1932, Serial No. 589,063

2 Claims. (Cl. 260—101)

This invention relates to the preparation of organic esters of cellulose and relates more particularly to the formation of cellulose acetate by the acetylation of a type of cellulose not used heretofore for this purpose.

An object of my invention is to prepare organic esters of cellulose by the esterification of cellulose having low viscosity characteristics. Other objects of this invention will appear from the following detailed description.

Prior to this invention, in the preparation of acetone-soluble cellulose acetate by the esterification of cellulose by means of an acetylating agent in the presence of sulfuric acid as catalyst and the subsequent ripening of the primary cellulose acetate formed until solubility in acetone is developed, there was always employed as the starting material a cellulose of relatively high viscosity characteristics, that is a cellulose having a viscosity of the order of 4,000 to 5,000 centipoise or more. It was considered that in order to obtain a cellulose acetate of relatively high viscosity characteristics, it was necessary to employ such high viscosity cellulose. Because of this high viscosity requirement, only relatively expensive cellulose material, such as may be obtained by purifying high grade cotton linters, was employed. Moreover such purified linters were freed of a relatively large amount of soda-soluble cellulose formed during the purification, thus entailing loss of material.

I have found that contrary to this previously held opinion, cellulose of low viscosity, having a viscosity of less than 0.2 to 10%, preferably from 0.5 to 2% of that of the cellulose previously employed for this purpose, may be acetylated or otherwise esterified by modern methods to produce organic esters of cellulose of sufficiently high viscosity characteristics to produce yarns, filaments, films and other products of required strength and other properties. This discovery is of great importance, since it renders possible the use of cellulose of much lower cost in the manufacture of cellulose acetate or other organic esters of cellulose. Thus wood pulp, low grade cotton linters and other cheap and plentiful cellulosic materials may be employed as sources of cellulose for the preparation of cellulose acetate, since these materials may be given sufficiently drastic purification treatments, such as digestion, bleaching and the like, to obtain a sufficiently pure cellulose. This was not considered possible heretofore, as such drastic purification reduces the viscosity of the cellulose below the limit considered permissible prior to my invention.

The use of low viscosity cellulose for making cellulose acetate or other organic esters of cellulose involves other advantages. The cellulose acetate formed from such cellulose is more uniform than cellulose acetate made from cellulose of higher viscosity. Lower temperatures may be employed during the acetylation, a less amount of sulfuric acid or other sulfuric-forming catalyst may be employed for the acetylation without danger of gelatinization or solidification of the charge during acetylation. Furthermore, a smaller amount of acetic acid or other solvent diluent, say from 5 to 50% less, may be employed in the acetylating mixture. Moreover acetylation of the low viscosity cellulose proceeds more easily and produces solutions that are substantially free of unacetylizable residue.

The cellulose acetate or other organic ester of cellulose formed from the cellulose of low viscosity, as compared with an ester formed from high viscosity cellulose, has better solubility, solutions thereof have higher clarity, and such solutions have better spinning stability; that is, they are capable of forming filaments of finer denier with less liability of stoppage of the spinning process.

In accordance with my invention then, I prepare an organic ester of cellulose by subjecting a cellulose of low viscosity characteristics to esterification by means of a suitable esterifying mixture.

This invention is applicable to the preparation of organic esters of cellulose such as cellulose formate, cellulose acetate, cellulose propionate and cellulose butyrate, but will be described more specifically in connection with the preparation of cellulose acetate.

As stated, the cellulose employed for making the organic ester of cellulose is one of low viscosity, having a viscosity of 5 to 200 centipoise and preferably 25 to 100 centipoise, which corresponds roughly to a viscosity of ½ to 8 seconds. In general, the lower the viscosity of the cellulose employed, the higher will be the clarity of solutions formed from the resulting cellulose acetate.

I have found that the reduction of the viscosity of a cellulose of high cuprammonium viscosity is accompanied by the formation of soda soluble material. In fact, under conditions where soda soluble material is not removed in the process of reducing the viscosity, the amount of such soda soluble material present is closely related to the reduction of viscosity of the cellulose.

The viscosities of cellulose mentioned herein are those of a solution which is made by dissolving 2.5 grams of thoroughly dried cellulose in 97 ccs. of a cuprammonium solution containing 3% by weight of copper and 167 grams per litre of ammonia ($NH_3$). The absolute viscosity of such solution at 25° C. is given in centipoises, and the viscosity in seconds is expressed as the time required for a glass ball 3.3 mm. in diameter to fall a distance of 20 cm. vertically through such solution maintained at 25° C. The preparation of such solution and mode of determining the viscosity is that recommended by the Viscosity Committee of the Cellulose Division of the American Chemical Society reported in the Journal of Industrial and Engineering Chemistry, Analytical Edition, No. 1, Page 49 (1929).

The low viscosity cellulose employed for esterification may contain any soda-soluble cellulose, in amounts up to 30% or more that may be present in the original cellulosic material or that may be formed during any purification process or any other process to which it may be subjected to reduce the viscosity thereof. Generally I have found that cellulose acetate formed from cellulose containing no more than from 5 to 10% of soda-soluble material has as good viscosity and other properties as cellulose acetate formed from cellulose not containing soda-soluble material. Indeed, it appears that during the acetylation some of the soda-soluble cellulose is converted into the soda-insoluble variety, as is indicated by the fact that when cellulose acetate formed from a cellulose of high soda solubility is saponified back to cellulose, the regenerated cellulose so formed contains less soda-soluble material than the original cellulose. The soda solubility of the cellulose is determined by heating the cellulose at boiling temperatures with a 3% solution of sodium hydroxide in amount equal to 100 times the weight of the cellulose for a period of one hour, and determining the loss of weight. It is to be understood that the term soda soluble material as here used refers to material of cellulosic origin whether present in the original cellulose or formed during the purifying or viscosity reducing process.

The low viscosity cellulose employed in this invention may be prepared in any suitable manner and from any suitable cellulosic material such as wood pulp, grasses, straw, cotton or cotton linters by subjecting them at normal or elevated temperatures to the action of purifying agents or other agents that cause reduction in viscosity. Examples of such agents are solutions of sulfuric acid or of sulfuryl chloride in acetic acid; aqueous solutions of acetic acid, formic acid, phosphoric acid, sulfuric acid, hydrochloric acid, nitric acid or other acids; solutions of bleaching powder, sodium hyperchlorite or other oxidizing agents such as solutions of hydrogen peroxide, etc. The use of cellulose formed by the digestion of cellulosic material with alkaline liquors, in which case soda-soluble material may be removed, is not excluded from this invention.

In order to increase the clarity of the resulting cellulose acetate, I prefer to pretreat the cellulose, prior to acetylation, by subjecting the same to the action of formic acid, acetic acid or other acids, either in liquid or vapor form, as is more fully described in the U. S. patents to H. Dreyfus Nos. 1,697,907, 1,708,787, 1,711,110, 1,711,111, 1,731,299 and 1,831,101.

The cellulose may be esterified by subjecting the same to an esterifying agent comprising formic acid or the anhydride or chloride of the acid corresponding to the radical to be introduced, such as acetic, propionic or butyric anhydride or acetyl, propionyl or butyryl chloride. The esterifying agent preferably contains a solvent for the organic ester of cellulose to be produced, examples of which are acetic acid and propionic acid. If the cellulose acetate is to be formed by the suspension method, that is wherein the cellulose acetate does not become dissolved in the acetylating bath, the acetic acid or other solvent may be replaced in whole or in part by a non-solvent diluent such as benzol, carbon tetrachloride or ethyl ether.

While I prefer to employ sulfuric acid as the catalyst, other sulfuric-forming catalysts or other catalyst such as zinc chloride may be employed.

As previously stated, in the case of the formation of cellulose acetate by esterifying cellulose by means of an esterifying agent comprising acetic anhydride, acetic acid and sulfuric acid as catalyst, the use of cellulose of low viscosity presents the advantage that the amount of acetic acid required is reduced, the amount of acetic acid employed being from 1.0 to 2.7, 2 to 2.5 parts by weight per part of cellulose being employed when cellulose acetate of high viscosity is to be made, while proportions of acetic acid as low as one part per part of cellulose may be employed when a cellulose acetate of low viscosity of lacquer grade is to be made. This reduction in the amount of acetic acid results in saving in cost of material. A further advantage in reducing the amount of acetic acid results from the fact that due to this, the concentration of the acetic anhydride in the acetylating mixture is higher (since a minimum fixed amount of the anhydride is required for complete acetylation), and as a result of the high concentration of the acetic anhydride, which may be 45 to 60% or more of the mixture, the time required for acetylation is reduced, which is a further saving and permits formation of a cellulose acetate of higher viscosity.

Furthermore, by employing cellulose of low viscosity, the amount of sulfuric acid required as catalyst is reduced to from less than 6 to 12% of the weight of the cellulose, which is a great advantage.

The cellulose acetate formed in the acetylation may be hydrolyzed or ripened by any known method until it develops the desired solubility in acetone or any other suitable solvent.

By employing cellulose of a viscosity of 10 to 100 centipoise, there may be formed cellulose acetate having a viscosity of 10 to 20 or more. These viscosities of cellulose acetate mentioned herein are those of a solution of 6 grams of cellulose acetate in 100 cc. at 25° C. on a scale in which the viscosity of glycerine at the same temperature is 100. This method of determining viscosity is set out in specification D-50 of the British Engineering Standards.

The cellulose acetate or other organic ester of cellulose formed by this invention is eminently suited for the making of artificial filaments, yarns, horsehair and bristles, films, celluloid-like articles, lacquers, molding powder and any other use for which cellulose esters are suitable.

In order further to illustrate my invention, but without being limited thereto, the following specific examples are given.

Example I

Purified and bleached cotton linters having a viscosity of 4500 centipoise are boiled for 2¼ hours in an aqueous solution of sulfuric acid of ½% concentration, one part of the cotton linters being treated with 20 parts of the acid solution. The cellulose is then washed and dried and its cuprammonium viscosity will be found to be about 22 and it will contain about 17% of soda-soluble material.

This cellulose of reduced viscosity is then pretreated by treating 100 parts by weight thereof with 40 to 100 parts of a mixture consisting of 40 to 60% of acetic acid and 60 to 40% of acetic anhydride and containing 0.5 part by weight of sulfuric acid. The time of pretreatment is 4 to 10 hours and the pretreatment is carried out at atmospheric temperatures.

After pretreatment, the cellulose is acetylated by means of an acetylating bath of such composition that it contains, including the chemicals used for pretreatment, 250 parts of acetic anhydride, 220 parts of acetic acid and 11 parts of sulfuric acid for each 100 parts by weight of cellulose. The acetylation requires from 1 to 2 hours. The cellulose acetate in the acetylation solution is ripened to acetone solubility by hydrolysis upon addition of water in any suitable manner.

The cellulose acetate after precipitation, washing and stabilizing will be found to have a viscosity of 8.

If the cellulose has not been pretreated, the time of acetylation will be prolonged several hours but the viscosity of the product is lower than that obtained by the above process wherein pretreatment is employed.

Example II

Purified and bleached cotton linters of 4500 centipoise viscosity are treated for 4 to 5 hours at atmospheric temperatures with a mixture equal to 25% of its weight, which mixture is made up of 1 part by weight of sulfuryl chloride dissolved in 4 parts by weight of glacial acetic acid. The cotton linters are washed and dried and its cuprammonium viscosity will be found to be about 10 centipoise and its soda solubility 30%.

The so treated cellulose is then pretreated as in Example I with a mixture of acetic acid, acetic anhydride and sulfuric acid, and is then acetylized by treatment with an acetylating agent which contains, including the chemicals used for pretreatment 250 parts by weight of acetic anhydride, 120 parts by weight of acetic acid and 9 parts by weight of sulfuric acid per 100 parts by weight of cellulose. During the acetylation the temperature is allowed to rise to around 40° C. The cellulose acetate is then ripened, washed, stabilized and dried. The resulting cellulose acetate has a viscosity of 1 to 2 and is suitable for use in lacquers.

Example III

The process of Example II is carried out, with the exception that the soda-soluble material is removed from the cellulose after its treatment with the sulfuryl chloride and acetic acid, by boiling the same in a 3% aqueous solution of caustic soda until the soda solubility of the cellulose is reduced from 30% to 1 to 2%. Pretreatment and acetylation are then carried out as in Example II and the resulting cellulose acetate is found to have about the same properties as that formed in said example.

Example IV

Cellulose prepared and pretreated in the same way as that described in Example II is acetylized by an acetylating mixture which contains, including the pretreating reagents, 250 parts by weight of acetic anhydride, 450 parts by weight of acetic acid and 3 parts by weight of sulfuric acid.

The cellulose acetate is ripened and after purification is found to have a viscosity of 1 to 2. This cellulose acetate is suitable for use where high stability is required.

Example V

Purified and bleached cotton linters of 4500 centipoise viscosity are boiled in a .01 normal aqueous solution of hydrochloric acid, the amount of such acid solution being 20 times the weight of the cellulose. The cellulose is washed and dried, and its cuprammonium viscosity will be found to be about 75 centipoise and its soda solubility 7.6%.

This cellulose is pretreated at atmospheric temperatures with a mixture containing 50 parts by weight of acetic acid, 50 parts of acetic anhydride and 0.5 part of sulfuric acid per 100 parts of the cellulose.

Acetylation of the cellulose is carried out by means of an acetylating agent which contains, including the pretreating chemicals, 200 parts of acetic anhydride, 180 parts of acetic acid, and 10 parts of sulfuric acid per 100 parts of cellulose. The acetylation is completed in one hour at temperatures up to 40° C. The cellulose acetate is ripened and purified in the usual way. Cellulose acetate of a viscosity of 20 or more is obtained in this manner.

Example VI

Purified and bleached cotton linters of 4000 centipoise viscosity are subjected to the action of the vapors of 100 volume hydrogen peroxide at 50° C. for 24 hours. The cuprammonium viscosity of the cellulose is now found to be 55 centipoise and its soda solubility 9.5%. After pretreating and acetylizing and ripening as described in Example V, cellulose acetate having viscosities from 15 to 20 will be produced.

It is to be understood that the foregoing detailed description is given merely by way of illustration and that many variations may be made therein without departing from the spirit of my invention.

Having described my invention what I claim and desire to secure by Letters Patent is:

1. Method of producing cellulose acetate of relatively high viscosity characteristics comprising acetylating a cellulose of relatively low viscosity characteristics having a viscosity of 25 to 100 centipoise as defined by means of an acetylating agent comprising sulfuric acid, acetic anhydride and an amount of acetic acid of 2 to 2.5 times the weight of the cellulose under such conditions as to produce a cellulose acetate, which when hydrolyzed to acetone solubility, has a viscosity of over 10 as defined.

2. Method of producing cellulose acetate of relatively high viscosity characteristics comprising acetylating a cellulose of relatively low viscosity characteristics having a viscosity of 25 to 100 centipoise as defined by means of an acetylating agent comprising sulfuric acid in amounts of 2 to 12% of the weight of the cellulose, acetic anhydride and an amount of acetic acid of 2 to 2.5 times the weight of the cellulose under such conditions as to produce a cellulose acetate, which when hydrolyzed to acetone solubility, has a viscosity of over 10 as defined.

CLIFFORD I. HANEY.